US010544007B2

(12) United States Patent
Hwang et al.

(10) Patent No.: US 10,544,007 B2
(45) Date of Patent: Jan. 28, 2020

(54) RISK-AWARE MANAGEMENT OF ELEVATOR OPERATIONS

(71) Applicant: International Business Machines Corporation, Armonk, NY (US)

(72) Inventors: Jinho Hwang, Ossining, NY (US); Byungchul Tak, Seoul (KR); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 46 days.

(21) Appl. No.: 15/467,619

(22) Filed: Mar. 23, 2017

(65) Prior Publication Data
US 2018/0273346 A1    Sep. 27, 2018

(51) Int. Cl.
*B66B 5/00* (2006.01)
*G06N 5/02* (2006.01)
*B66B 5/02* (2006.01)

(52) U.S. Cl.
CPC ............ *B66B 5/0012* (2013.01); *B66B 5/025* (2013.01); *G06N 5/02* (2013.01); *B66B 2201/4676* (2013.01)

(58) Field of Classification Search
CPC .................................................. B66B 5/0012
USPC ....................................................... 187/247
See application file for complete search history.

(56) References Cited

U.S. PATENT DOCUMENTS

| 4,839,631 | A | * | 6/1989 | Tsuji | ...................... | G08B 13/00 |
| | | | | | | 187/392 |
| 6,615,175 | B1 | * | 9/2003 | Gazdzinski | ............... | B66B 1/34 |
| | | | | | | 187/396 |
| 6,988,071 | B1 | * | 1/2006 | Gazdzinski | ............... | B66B 1/34 |
| | | | | | | 187/396 |
| 7,711,565 | B1 | * | 5/2010 | Gazdzinski | ............... | B66B 3/00 |
| | | | | | | 187/396 |

(Continued)

FOREIGN PATENT DOCUMENTS

| CN | 1919711 A | 2/2007 |
| CN | 101687609 A | 3/2010 |
| WO | 2016087557 A1 | 6/2016 |

OTHER PUBLICATIONS

Ovorsky, "Microsoft's 'smart elevator' knows where you're going", io9 We Come From the Future, Accessed Online: Mar. 22, 2017, 2 Pages. URL: http://io9.gizmodo.com/microsofts-smart-elevator-knows-where-youre-going-1504987584.

*Primary Examiner* — David S Warren
(74) *Attorney, Agent, or Firm* — Cantor Colburn LLP; Anthony Curro

(57) ABSTRACT

Embodiments of the invention are directed to computer-implemented methods, computer systems, and computer program products for operating an elevator car. The method includes receiving first inputs from one or more sensors. The method further includes receiving second inputs from one or more cameras. The method further includes determining the presence of a passenger on the elevator using the first inputs and the second inputs. The method further includes determining a set of characteristics related to the passenger using the first inputs and the second inputs. The method further includes predicting a set of predicted actions of the passenger, using machine-learning techniques. The method further (Continued)

includes determining an action to perform based on the set of predicted actions.

18 Claims, 6 Drawing Sheets

(56) References Cited

U.S. PATENT DOCUMENTS

| | | | |
|---|---|---|---|
| 9,802,789 B2 | 10/2017 | Kim et al. | |
| 9,815,664 B2 | 11/2017 | Zhang et al. | |
| 9,988,237 B1* | 6/2018 | Arguedas | B66B 1/2408 |
| 9,988,238 B2* | 6/2018 | Simcik | B66B 1/468 |
| 2006/0065491 A1* | 3/2006 | Zaharia | B66B 1/18 |
| | | | 187/391 |
| 2011/0026777 A1* | 2/2011 | Rhoads | G06F 3/017 |
| | | | 382/107 |
| 2012/0192289 A1* | 7/2012 | Gazdzinski | G06Q 30/0251 |
| | | | 726/28 |
| 2012/0197725 A1* | 8/2012 | Gazdzinski | G06Q 30/0251 |
| | | | 705/14.58 |
| 2013/0168191 A1 | 7/2013 | Mason | |
| 2015/0032459 A1* | 1/2015 | Gazdzinski | G06Q 30/0251 |
| | | | 704/275 |
| 2015/0058000 A1* | 2/2015 | Gazdzinski | G06Q 30/0251 |
| | | | 704/231 |
| 2015/0073809 A1* | 3/2015 | Gazdzinski | G06Q 30/0251 |
| | | | 704/275 |
| 2015/0081303 A1* | 3/2015 | Gazdzinski | G06Q 30/0251 |
| | | | 704/251 |
| 2015/0081309 A1* | 3/2015 | Gazdzinski | G06Q 30/0251 |
| | | | 704/275 |
| 2015/0096843 A1* | 4/2015 | Siddiqui | B66B 1/2416 |
| | | | 187/380 |
| 2015/0329316 A1* | 11/2015 | Lee | B66B 1/2458 |
| | | | 187/384 |
| 2016/0214830 A1* | 7/2016 | Simcik | B66B 1/468 |
| 2016/0221791 A1* | 8/2016 | Berryhill | B66B 1/468 |
| 2016/0292521 A1* | 10/2016 | Fang | B66B 1/2408 |
| 2016/0292522 A1* | 10/2016 | Chen | B66B 1/3476 |
| 2016/0295196 A1* | 10/2016 | Finn | G06T 7/11 |
| 2016/0311646 A1* | 10/2016 | Bryant | G06K 9/00288 |
| 2016/0368732 A1* | 12/2016 | Zhao | B66B 1/3476 |
| 2017/0032785 A1* | 2/2017 | Gazdzinski | G06Q 30/0251 |
| 2017/0102918 A1* | 4/2017 | Gazdzinski | G06Q 30/0251 |
| 2017/0109132 A1* | 4/2017 | Gazdzinski | G06Q 30/0251 |
| 2017/0210594 A1* | 7/2017 | Gerstenmeyer | B66B 1/2466 |
| 2017/0261959 A1* | 9/2017 | Kuusinen | B66B 25/00 |
| 2017/0275134 A1* | 9/2017 | Toner | B66B 5/0012 |
| 2017/0349398 A1* | 12/2017 | Toutaoui | B66B 5/0025 |
| 2017/0362054 A1* | 12/2017 | Legeret | B66B 5/0012 |
| 2017/0369275 A1* | 12/2017 | Saraswat | B66B 1/28 |
| 2018/0086597 A1* | 3/2018 | Song | B66B 1/3461 |
| 2018/0093867 A1* | 4/2018 | Deng | B66B 29/005 |
| 2018/0099840 A1* | 4/2018 | Armistead | G05B 19/042 |
| 2018/0105390 A1* | 4/2018 | Salmikuukka | B66B 3/008 |
| 2018/0111788 A1* | 4/2018 | Kim | B66B 1/2408 |
| 2018/0148296 A1* | 5/2018 | Arguedas | B66B 1/2408 |
| 2018/0182199 A1* | 6/2018 | Yamine | G07C 9/00896 |
| 2018/0237259 A1 | 8/2018 | Miyajima et al. | |
| 2018/0244491 A1* | 8/2018 | Kitov | G05B 13/02 |
| 2018/0273345 A1* | 9/2018 | Rao | B66B 3/002 |
| 2018/0273346 A1* | 9/2018 | Hwang | B66B 5/0012 |
| 2018/0278434 A1* | 9/2018 | Maseng | H04L 12/2836 |
| 2018/0287970 A1* | 10/2018 | Baldi | H04L 51/04 |
| 2018/0362296 A1* | 12/2018 | Friedli | B66B 5/0012 |
| 2019/0002234 A1* | 1/2019 | Shinohe | B66B 1/2408 |
| 2019/0012864 A1* | 1/2019 | Yamine | G07C 9/00896 |

* cited by examiner

RISK-AWARE MANAGEMENT OF ELEVATOR OPERATIONS

BACKGROUND

The present invention relates in general to the field of computing. More specifically, the present invention relates to systems and methodologies for improving elevators for more secure usage.

Elevators are present in many buildings that have multiple floors. Elevators can present a security risk. A typical elevator provides no security features. It only provides a way for people to move between floors. Other elevators have security features, such as card keys or the presence of security that controls access to the elevators. However, those require additional equipment or personnel in order to use.

SUMMARY

Embodiments of the present invention are directed to a computer-implemented method for operating an elevator car. The method includes receiving first inputs from one or more sensors. The method further includes receiving second inputs from one or more cameras. The method further includes determining the presence of a passenger on the elevator using the first inputs and the second inputs. The method further includes determining a set of characteristics related to the passenger using the first inputs and the second inputs. The method further includes predicting a set of predicted actions of the passenger, using machine-learning techniques. The method further includes determining an action to perform based at least in part on the set of predicted actions.

Embodiments of the present invention are further directed to a computer system for operating an elevator car. The computer system includes a memory and a processor system communicatively coupled to the memory. The processor system is configured to perform a method. The method includes receiving first inputs from one or more sensors. The method further includes receiving second inputs from one or more cameras. The method further includes determining the presence of a passenger on the elevator using the first inputs and the second inputs. The method further includes determining a set of characteristics related to the passenger using the first inputs and the second inputs. The method further includes predicting a set of predicted actions of the passenger, using machine-learning techniques. The method further includes determining an action to perform based at least in part on the set of predicted actions.

Embodiments of the present invention are further directed to a computer program product for customizing a user's virtual reality avatar. The computer program product includes a computer-readable storage medium having program instructions embodied therewith. The program instructions are readable by a processor system to cause the processor system to perform a method. The method includes receiving first inputs from one or more sensors. The method further includes receiving second inputs from one or more cameras. The method further includes determining the presence of a passenger on the elevator using the first inputs and the second inputs. The method further includes determining a set of characteristics related to the passenger using the first inputs and the second inputs. The method further includes predicting a set of predicted actions of the passenger, using machine-learning techniques. The method further includes determining an action to perform based at least in part on the set of predicted actions.

Additional features and advantages are realized through techniques described herein. Other embodiments and aspects are described in detail herein. For a better understanding, refer to the description and to the drawings.

BRIEF DESCRIPTION OF THE DRAWINGS

The subject matter that is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
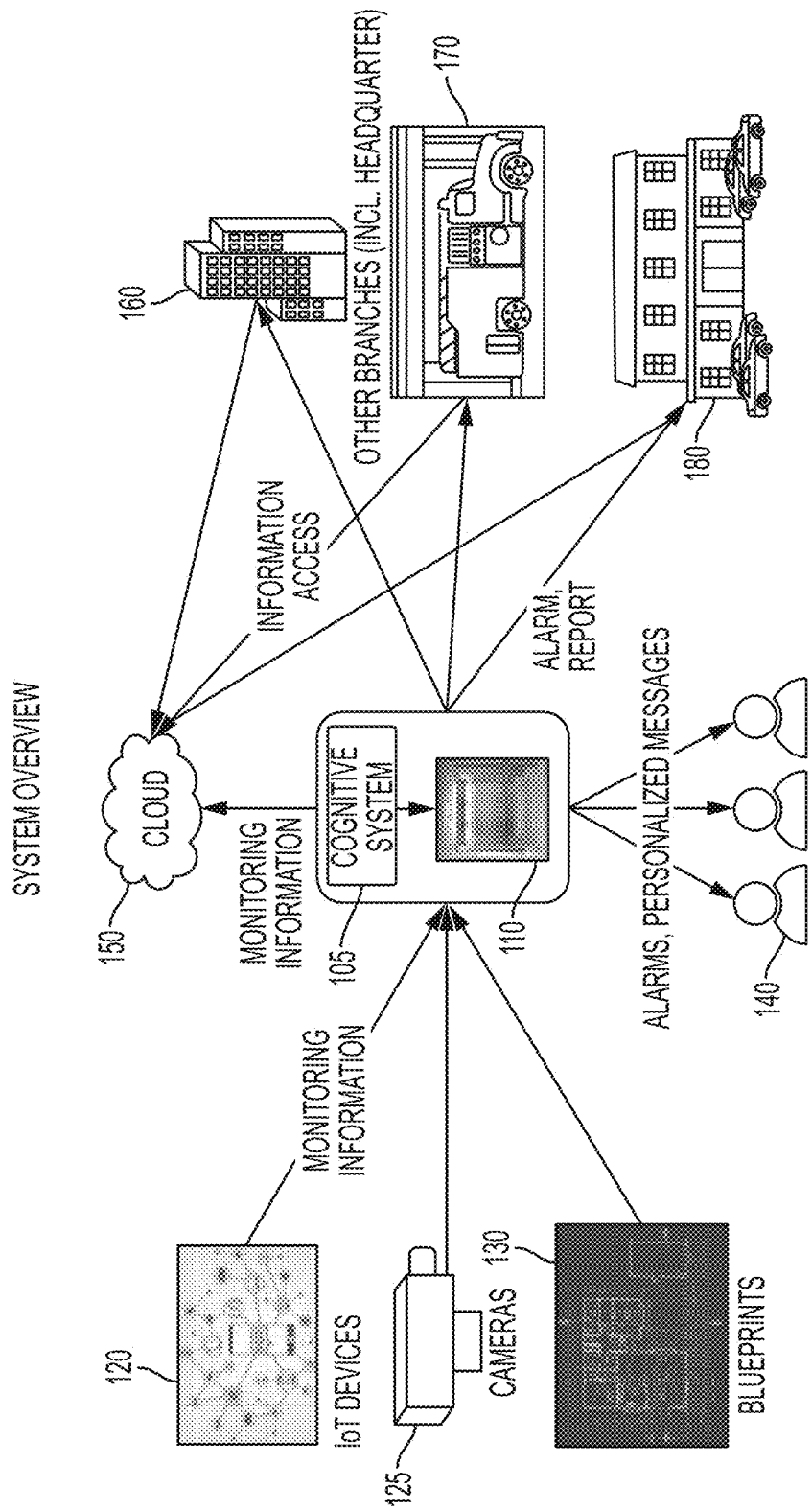
FIG. 1 depicts an overview of a system according to embodiments of the invention.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of usage with specific devices is included herein, implementation of the teachings recited herein are not limited to embodiments described herein. Rather, embodiments are capable of being implemented in conjunction with any other type of electronic device, now known or later developed.

At least the features and combinations of features described in the immediately present application, including the corresponding features and combinations of features depicted in the figures amount to significantly more than implementing a method of managing the operation of an elevator. Additionally, at least the features and combinations of features described in the immediately following paragraphs, including the corresponding features and combinations of features depicted in the figures go beyond what is well understood, routine and conventional in the relevant field(s).

Elevators revolutionized high-rise buildings. An elevator comprises an elevator car that travels between floors of a structure within an elevator shaft. Without elevators, buildings and structures of more than a few stories tall become difficult to navigate or even impossible for the disabled. Early elevators were manually operated, with some buildings using the services of employees to operate the elevator. Later, automatic elevators were developed. Automatic elevators allow passengers to select the destination of an elevator by merely pushing a button on a control panel. An automatic elevator obviates the need for an employee in every elevator of a building. However, while have an employee in every elevator incurred extra costs to a building owner, they also provide an amount of security to the elevator, because the presence of an elevator operator might deter a bad actor from accessing a building.

Previous methods of providing security involve the issuance of a key. The key can be a metal key that is inserted into a tumbler lock. The key could also be a digital key, such as a keycard that is inserted into a slot or held against a reader to allow access. Disadvantages of a key include the fact that they require people to carry a key with them whenever they need to use the elevator and they make it harder for guests to use an elevator.

Embodiments of the present invention address the above-described issues by using a novel method and system to allow monitor the occupants and state of an elevator, provide risk assessments regarding the elevator, and provide ameliorating actions for any problems. Embodiments monitor passengers as they enter an elevator using a variety of sensors. Information regarding the passengers can be compared to a variety of sources to provide a risk assessment. Embodiments monitor the status of the elevator and can sound an alarm or contact authorities based at least in part on risks that are present. Embodiments can provide news or other updates to known users. Embodiments can analyze items being brought on the elevator to monitor for stolen goods.

With reference to FIG. 1, an overview of a system 100 of an exemplary embodiment of the invention is shown. System 100 includes an elevator car 110, which is configured to move vertically within an elevator shaft (not illustrated). While only a single elevator car is shown in FIG. 1, it should be understood that elevator car 110 could represent a bank of multiple elevator cars, each of which is included in system 100.

Elevator car 110 is coupled to cognitive system 105. Cognitive system 105 can be a computer system such as that illustrated as system 300 and described in further detail below. Cognitive system 105 can be coupled to a variety of different systems and entities. Internet of things (IoT) devices 120 can include one or more sensors of any type. The terms "IoT device" and "sensor" can be used interchangeably. These can include weight sensors, temperature sensors, odor detectors, smoke detectors, carbon monoxide sensors, light sensors, motion, biometric sensors, microphones, electronic device sensors (that detect Bluetooth signals, WiFi signals, near-field communication (NFC) devices, radio frequency identification devices (RFID), etc.), and the like. IoT devices 120 can also include sensors that detect the operating and maintenance conditions of each elevator car within a bank of elevator cars.

There can be one or more cameras 125. In an embodiment with multiple elevator cars, each elevator car in a bank of elevators can contain one or more video cameras or still cameras. In addition, the area outside the elevator cars (for example, a hallway or a lobby) can include one or more cameras, possibly at each floor of a structure.

Blueprint information 130 can include a variety of different information about where elevator car 110 is located. It should be understood that elevator car 110 is located in a structure with multiple floors. Blueprint information 130 includes information that is located in a traditional blueprint, such as the layout of the structure, the location of doors, ducts, plumbing, electric lines, and the like. In addition, the blueprint information can include information about tenants in the structure. This can include basic information, such as the number of tenants on each floor. This information can be more detailed, as will be discussed in further detail below.

Also illustrated in FIG. 1 are passengers 140. Information that is useful to passengers can be presented in one of a variety of manners, as will be discussed in further detail below. This can be accomplished through video displays and speakers for audio. There are also a variety of ways in which a user can interface with the elevator, such as with buttons to select a floor, microphones, telephones, and the like Also presented in FIG. 1 are external locations to which cognitive system 105 is coupled. These external locations can include the Internet 150, a central location 160, (such as the headquarters of a building owner), fire department 170, and police department 180. The manner in which the external locations are used will be discussed in further detail below. In general, cognitive system 105 can send information to Internet 150, a central location 160, (such as the headquarters of a building owner), fire department 170, and police department 180. The information being sent to Internet 150 can be general maintenance information, information about the tenants to be stored for later use, and any other type of information that might need to be stored. Via Internet 150, the information can be stored at central location 160, which can be under the control of an entity in control of the structure in which elevator car 110 is located. Information can be stored in a database or a knowledge base 250 located in any location, including in cloud locations.

Information that is transmitted to fire department 170 and police department 180 can be emergency information. A basic example is that, if smoke or a fire is detected, an alarm can be sent to fire department 170 and/or police department 180 to request emergency assistance. It should be understood that fire department 170 can represent any type of emergency authority, such as emergency medical technicians, ambulance services, and the like. It should be understood that police department 180 can represent any law enforcement agency, such as local law enforcement, a sheriff's department, a state police agency, a federal agency (such as the Federal Bureau of Investigation (FBI), Secret Service, National Security Advisors (NSA), National Guard, and the like).

Figure 2:
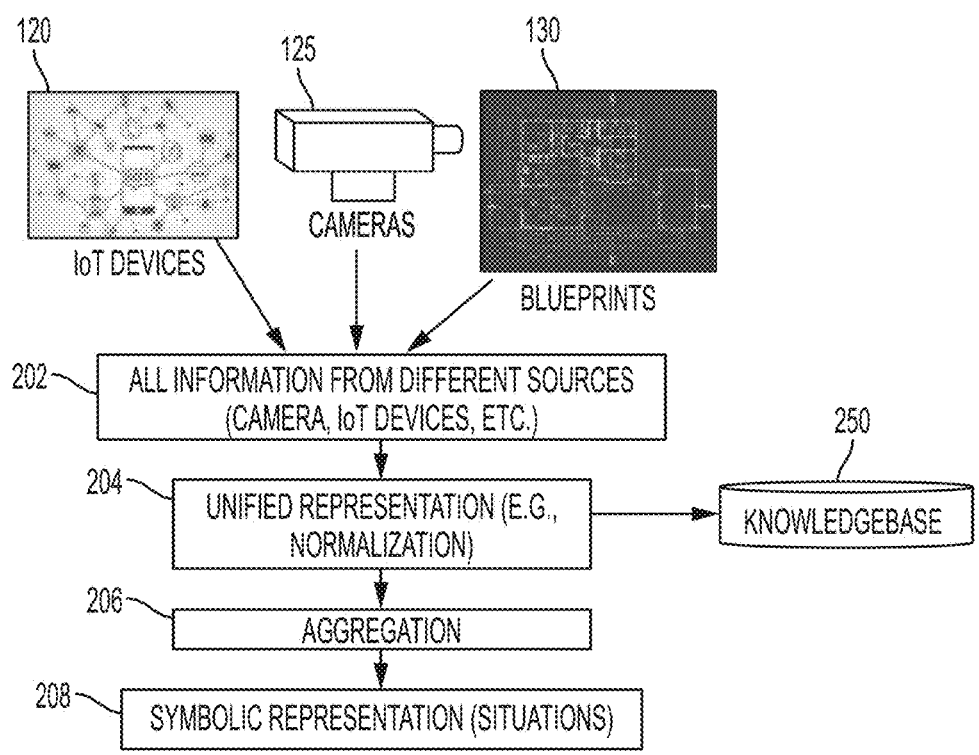
FIG. 2 depicts a flow diagram illustrating a methodology according to embodiments of the invention.
Figure 3:
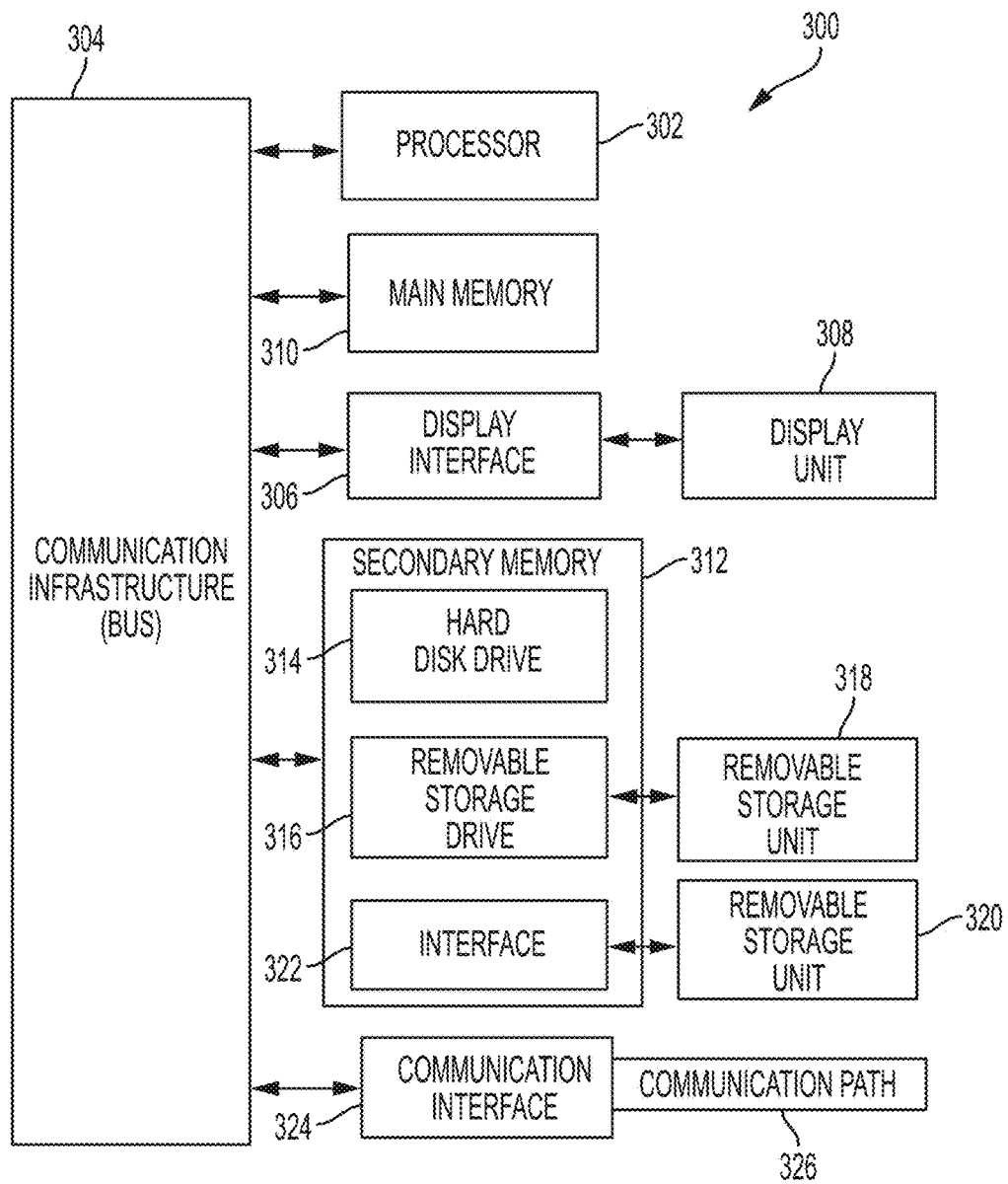
FIG. 3 depicts a computer system capable of implementing hardware components according to embodiments of the invention.

A flowchart illustrating a method 200 according to embodiments of the invention is presented in FIG. 2. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In some embodiments, portions of method 200 can be implemented by system 300 (FIG. 3).

Method 200 presents a generic flow for the operation of an embodiment to account for situations that will be described in further detail below. Information from the various sources (such as IoT devices 120, cameras 125, and blueprint information 130) is fed into a system (such as cognitive system 105) containing an embodiment (block 202). The information is normalized into a unified representation and stored in a knowledge base 250 for future use (block 204). The various data is aggregated (block 206). Thereafter, a symbolic representation of any situation can be created (block 208). The symbolic representation can be used to classify any action and formulate a response. There are many situations that can occur and responses formulated in response to the situation. Exemplary situations are presented below.

IoT devices 120 are used to detect a wide-variety of information. Some of the information is information about the state of the elevator car (or each elevator car in a bank of elevator cars). The information can include whether the elevator car is moving or stationary, whether the elevator car is stuck, whether the elevator is falling. Other IoT devices can detect the inside of elevator car 110. For example, the number of passengers can be determined, the weight of the passengers, whether the weight of the passengers is over limit, and the like.

Such information can be used to improve the operation of the elevators, such as sending more elevator cars to busy floors or adjusting the timing of the elevators at certain times of the day to improve the flow of passengers. Adjusting the timing at certain times of the day can use data from previous days as inputs to the machine-learning algorithm to determine which floors are busy during certain times of day or certain days of a week.

Performance information about the elevators can be stored and compared over time. This can be accomplished by storing information, such as through Internet 150. Thereafter, performance information can be compared over time using cognitive system 105. By comparing information, one might be able to determine if maintenance should be performed on a particular elevator car due to deteriorating performance.

Cameras 125 also can include one or more cameras that are located at the doors of the elevator car pointed at the interior of the building. Such information can be used to determine how many people are waiting at an elevator door (using, for example, image recognition technology to count people who are waiting) as well as for determining a status of the passengers, as will be described in further detail below. In a similar manner, IoT devices 120 also can include sensors that are optimized to detect conditions outside of an elevator car.

In the event that an emergency condition is detected via IoT devices 120, emergency authorities (such as fire department 170 and police department 180) can be contacted to request their assistance. An emergency condition can include a wide variety of conditions. Conditions can include the condition of the elevator car or the building, such as detection of smoke, detection of fire, detection of a stuck elevator, and the like. Conditions also can include a condition of a passenger. Images captured by cameras 125 can be analyzed to determine, for example, if a passenger has fallen or become ill. In such a case, emergency authorities can be notified. Additional emergency conditions will be discussed below.

In addition, IoT devices 120 can be used in conjunction with cameras 125 to detect information about passengers 140. Cognitive system 105 can be used to understand habits, activities, and movement of passengers 140 who use elevator car 110 on a regular basis (such as an owner, a tenant or an employee). A variety of information can be used to determine if a passenger is a known passenger. A tenant can be issued a pass, such as a radio frequency identification (RFID) device that can be detected. Devices carried by a passenger can be detected. For example, a media access control (MAC) address of a smartphone can be detected and stored in a database or a knowledgebase 250 via Internet 150.

Facial recognition can be performed on each passenger of the elevator car. Facial recognition can be accomplished by using cameras 125 to detect facial features of passengers. The facial features can be sent via Internet 150 to a database or knowledge base 250. Thereafter, each passenger can be compared to the database or knowledge base 250 to determine if the passenger is a regular passenger. Information associated with each regular passenger also can be stored in the database or knowledge base 250, as will be discussed below.

If facial recognition fails to recognize a passenger of elevator car 110, the facial recognition algorithm can be used to compare the unknown face to a database of known faces. For example, one or more "most wanted" lists can be consulted, as can terrorist watch lists and the like to determine if the unknown passenger is known or suspected to be a bad actor. Other lists can be consulted, such as "missing person" lists "Amber alert" lists and "Silver alert" lists. In addition to facial recognition, characteristics of the unknown passenger, such as clothing, height, weight, and gender can be compared to those of a potential offender. A confidence score can be calculated to determine how certain a system is that the passenger matches that of a known bad actor. If a bad actor is detected (or a confidence score is higher than a predetermined value), then authorities can be contacted, such as by using Internet 150 to send a message to police department 180.

If the bad actor is alone in an elevator car, the elevator car can be slowed or shut down to allow a police department to capture the bad actor. Once the bad actor is detected, if he exits the elevator car his movement can be tracked using one of a variety of different techniques (such as additional cameras located in common areas of the building) such that the emergency services can be notified.

On-going criminal activity also could be detected through the use of camera 125. The existence of sharp objects or firearms in the hands of a passenger or signs of a struggle of a passenger can be a sign of on-going criminal activity. In such a case, the elevator car can be stopped immediately to allow the victim to leave. In addition, appropriate authorities, such as police department 180, can be contacted.

Other actions can be performed if an unknown face (also known as an "unknown passenger") is present. In a strictly controlled building, the elevator might be rendered inoperable if an unknown face is present. In such an instance, a message can be issued to the passengers of the elevator car, such as through a video or audio source located in elevator car 110 that the unknown passenger must sign-in in order to visit the building. In a less strictly controlled building, the presence of an unknown person can merely be noted in a database or knowledge base 250, transmitted via Internet 150. Thereafter, it can be determined when the unknown person leaves the building or structure.

Other emergencies also can be detected by a combination of IoT devices 120 and cameras 125. For example, the illness of a passenger 140 can be detected through a combination of techniques that can be learned via a machine-learning algorithm used by system 105. The illness of a passenger 140 can be detected by motions of passenger 140 within an elevator car (or while waiting for an elevator car). Motions that indicate illness, such as fainting or vomiting can be learned and detected to be an emergency condition that should be addressed. IoT devices 120 can also include biometric sensors that sense a variety of conditions. A passenger who has a chronic illness or other medical condition could have a wearable sensor or smartphone app that broadcasts a particular signal when a certain condition occurs (for example, low blood sugar, presence of a fever, and the like). An IoT device 120 could detect such a signal and take appropriate action.

A variety of actions can occur when such a condition is sensed. For example, the particular elevator car might proceed immediately to the ground floor, bypassing passengers waiting at other floors, to allow the ill passenger to leave immediately. Fire department 170 or police department 180 could be contacted to provide ambulance services if a cognitive system determines that a particularly serious condition exists.

Emergency personnel (such as firefighters, emergency medical technicians, or police officers) could have special equipment (for example, a wearable or a smartphone app) that broadcasts a signal (such as a Bluetooth or RFID signal) indicating when they are on an emergency call. Thereafter, when such a signal is detected, the elevator car allows the emergency personnel to travel to their destination without having the elevator car stop at other floors. This allows both a quick entry and a quick exit of the building or structure by emergency personnel.

As briefly discussed above, blueprint information 130 contains information that is in a traditional blueprint (such as the layout of the building in which elevator car 110 is located). Blueprint information 130 also contains other information that can be useful in certain situations. In an emergency situation, such information can include the number of tenants on each floor. This can include generic information (for example, there are typically 50 people on the $3^{rd}$ floor). This also can include specific information due to the above-described tracking capabilities (for example, while there are typically 50 people on the $3^{rd}$ floor, 25 of them are present). In addition to generic floor layout information, there can be specific information, such as safest evacuation route. There can be information about tenants who might need special assistance, due to age or other infirmities. This information can be sent to fire department 170 or police department 180 in case of an emergency.

Blueprint information 130 also can include information about the belongings of a tenant. In some embodiments, this information can be obtained by having a tenant enter specific information into a pre-established database. In some embodiments, this information can be obtained through repeated observation. For example, a tenant might regularly remove his bicycle from the building. Information about the bicycle can be obtained by observation. If the information is entered by the tenant, then specific information, such as the make, model, and serial number of the item can be entered. If the information is obtained through observation, observed information can be stored, such as the color or any distinguishing marks of the item.

Thereafter, if IoT devices 120 or cameras 125 detect the presence of the belonging such information can be noted and stored. If the tenant later reports that the belonging is missing, the information about the person who left with the belonging can be forwarded to police department 180.

Other information stored in blueprint information 130 can include basic demographic information all the way to more specific information, such as occupation or interests. Thereafter, when a passenger enters elevator car 110 and is recognized, information that is useful to the passenger can be presented via a video and/or audio output. If the passenger works at a law firm, the passenger can be presented with legal news during the elevator trip. If the passenger works as a stockbroker, the passenger can be presented with business news. If the passenger is a child, the passenger can be presented with cartoons. Generic information also can be presented. Such generic information can include weather information, general news, general sports information, and the like. Such generic information also can include information specific to the building, such as scheduled maintenance, local road closures, or other local traffic information. Specific information (such as interests) could be used to provide personalized information to certain tenants. For example, a fan of a first baseball team could receive news about the first baseball team when he enters an elevator car. A fan of a second baseball team could receive news about the second baseball team when he enters an elevator car.

In some embodiments, each tenant can provide specific demographic information. There can be a sign-in process, where a tenant provides an address (the floor they typically visit at the building), basic demographic information (such as the name), or specific interests, such as a favorite baseball team. The tenant could be issued a hardware token, such as a keycard or an RFID device, that can be used to provide recognition services. The tenant could be photographed (or provide a photograph) for facial recognition purposes. The tenant could provide information regarding a mobile device, such as a Media Access Control (MAC) address. The tenant could link a device, such as a phone or a wearable device, to a system such that the tenant's presence is recognized upon entering an elevator car. Thereafter, the location of the user can be used in an emergency. For example, during a building evacuation, the dynamic location of the user could be tracked. It might be known that the tenant entered at a certain time, changed floors at a later time, but never went to the ground floor, and is therefore still in the building.

Any of the above classifications of conditions sensed by the combination of IoT devices 120, cameras 125, and blueprint information 130 can occur using a machine-learning algorithm. A support vector machine (SVM) can be used to analyze the incoming data (such as those stored in knowledge base 250) and categorize the data.

An exemplary algorithm is presented in Table 1. Table 1 shows pseudocode that can be used to perform classification training. The pseudocode iterates through training data to train an SVM. The equation tries to maximize the loss reduction with the maximal confidence. In other words, the chosen action undertaken is the one that reduces the potential loss by the greatest amount.

Figure 6:
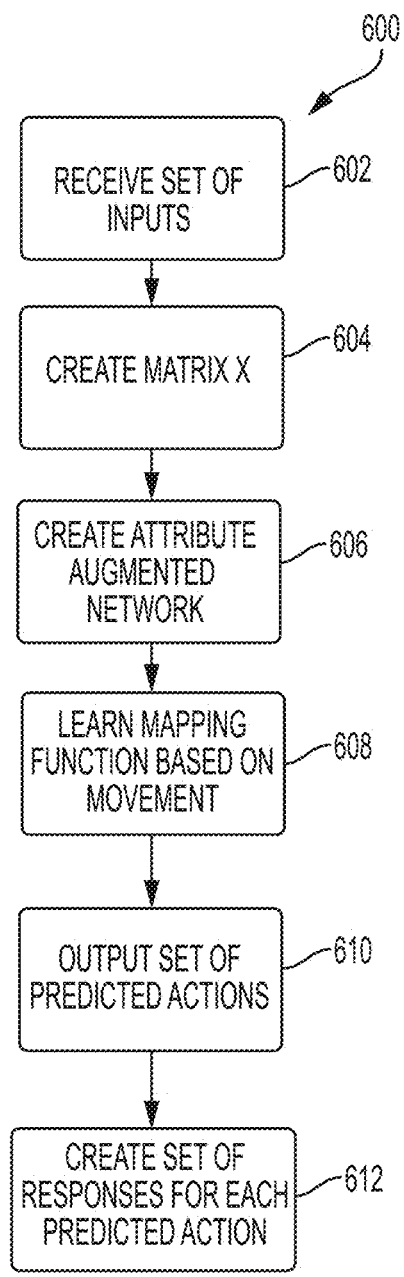
FIG. 6 depicts a flow diagram illustrating the operation of an algorithm according to embodiments of the invention.

During use, an exemplary algorithm operated in the manner described in FIG. 6. FIG. 6 presents a flowchart illustrating a method 600 according to embodiments of the invention. Method 600 is merely exemplary and is not limited to the embodiments presented herein. Method 600 can be employed in many different embodiments or examples not specifically depicted or described herein. In some embodiments, the procedures, processes, and/or activities of method 600 can be performed in the order presented. In other embodiments, one or more of the procedures, processes, and/or activities of method 600 can be combined or skipped. In some embodiments, portions of method 600 can be implemented by system 300 (FIG. 3).

An algorithm receives inputs (block 602). The inputs can be received from sensors such as IoT devices 120. The inputs also can be received from cameras 125. The inputs can include actions (y), performed by a user ($u_i$), at a situation (s), at a time (t), all determined by the inputs.

Y can be defined as the action history given the inputs:

$$Y=\{(y,u,s,t,r)\}_{i,t}$$

For each value of y within Y, the value is either 0 (not performed) or 1 (performed). For example, the action can be entered the elevator or did not enter the elevator.

A matrix X can be created (block 604). Matrix X is an attribute matrix of dimension N×d. Each row $x_i$ corresponds to a user. Each column is an attribute. As described in more detail above, attribute can include health attributes, age attributes, interests, floor they reside in, and the like. Therefore, each element $x_{i,j}$ of matrix X describes an attribute of the user.

An attribute-augmented network is created based on the inputs (block 606). The attribute augmented network can be represented by the variable G, where:

$G=(V_t, E_t, X_t, S_t, R_t, Y_t)$. In this formulation, $V_t$ is the set of human hubs, $E_t$ is the set of links between human hubs at time t, and $S_t$ is the set of situations.

Movement is tracked to learn a mapping function (block 608). Mapping function f tracks the movement of people and objects at various points in time.

The context of the algorithm is that a user's actions at a time t is influenced by another user's actions at a time t−1, in a related situation or context. The user's actions can also be dependent on his or her own previous actions in a given context. It also can be assumed that each user's actions have a strong correlation with another user.

Based at least in part on the inputs and criteria described above, the output is a set of predicted actions (block 610). For each action in the set of actions, there is a probability that each action can occur. In addition to the set of predicted actions, there can be a set of responses (block 612). The response can be a response such as one described above, such as contacting emergency authorities or changing the operation of the elevator cars.

Figure 5:
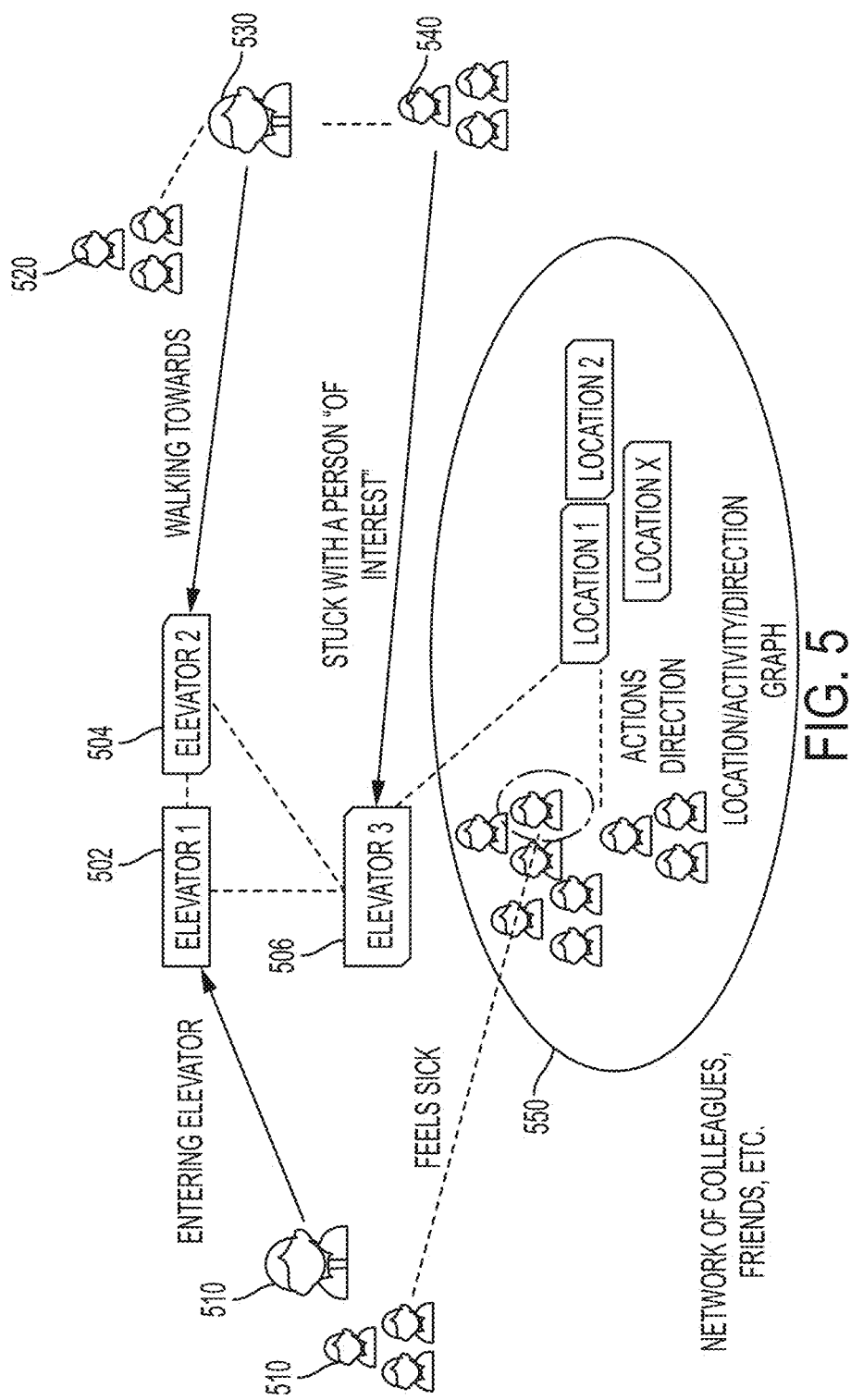
FIG. 5 is a diagram illustrating exemplary situations that can occur in accordance with embodiments of the invention.

Table 1 can be examined in conjunction with FIG. 5, which presents exemplary situations that can occur. In FIG. 5, the exemplary structure has three elevator cars 502, 504, and 506. A group of passengers 510 is approaching elevator car 502. During this time, an embodiment senses that one of the group of passengers 510 has become ill. Therefore, the embodiment must determine a course of action. The course of action can include contacting emergency personnel (such as fire department 170 or police department 180) or contacting people located on the emergency contact list of the ill passenger. An embodiment might determine that both actions should be taken or that neither action should be taken. An embodiment might also determine that the elevator car should not make any stops before reaching the ground floor, to allow the ill passenger to leave faster, for example.

A group of passengers 520 might be approaching elevator car 504 along with passenger 530. There might not be any situations present with group 520 or passenger 530, so the only decision made by an embodiment is the news items to display to group of passengers 520 and passenger 530. In addition, an embodiment can decide if group 510 or group 540 should be given priority to group 520 and passenger 530.

Group 540 of passengers might contain a "person of interest" within group 540. An embodiment can decide on an action to take, such as prioritizing an elevator car for group 540 or ensuring that an elevator car response is slow. An embodiment can also decide to contact emergency personnel (such as fire department 170 or police department 180).

FIG. 3 depicts a high-level block diagram of a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them. Computer system 300 can have one of a variety of different form factors, such as a desktop computer, a laptop computer, a tablet, an e-reader, a smartphone, a personal digital assistant (PDA), and the like.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326.

Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
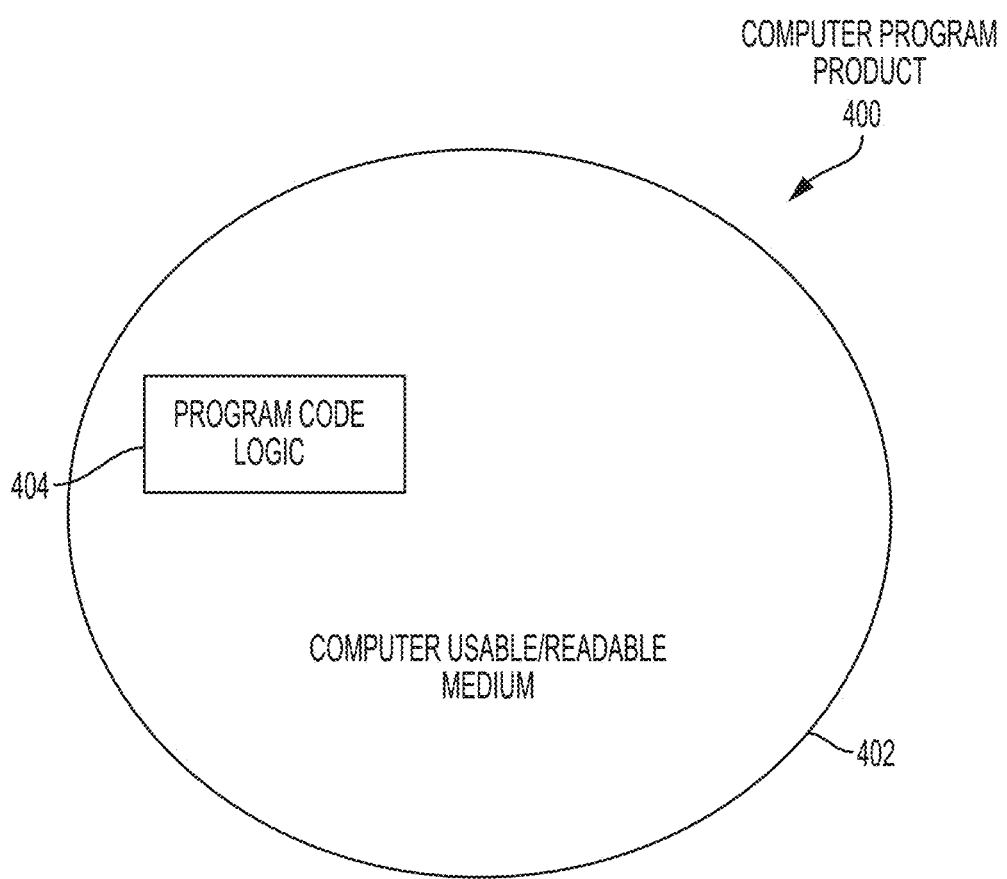
FIG. 4 depicts a diagram of a computer program product according to embodiments of the invention.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the consumer's computer, partly on the consumer's computer, as a stand-alone software package, partly on the consumer's computer and partly on a remote computer or entirely on the remote computer or server. In the latter scenario, the remote computer can be connected to the consumer's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer-implemented method for operating an elevator car, the method comprising:
    receiving, by a processor, first inputs from one or more sensors;
    receiving, by the processor, second inputs from one or more cameras;
    determining, by the processor, the presence of a known passenger on the elevator using the first inputs and the second inputs;
    retrieving, by the processor, a set of attributes related to the known passenger from a knowledge base, wherein the set of attributes includes at least one of health, age, and interests;
    determining, by the processor, a set of characteristics related to the known passenger using the first inputs and the second inputs, wherein the set of characteristics includes at least one of clothing, height, weight, and gender;
    predicting, by the processor, a set of predicted actions of the known passenger, using machine-learning techniques;
    determining, by the processor, an action to perform based at least in part on the set of predicted actions, wherein the action comprises customizing and displaying content based on the set of attributes;
    identifying, by repeated actions observed from the second inputs, distinguishing marks of a personal belonging associated with the known passenger; and
    in response to receiving an indication that the personal belonging is missing, transmitting information on a suspect passenger observed, from the second inputs, with the personal belonging to a law enforcement agency.

2. The computer-implemented method of claim 1 further comprising:
    determining, by the processor, that the known passenger requires assistance; wherein:
    the action to perform comprises contacting emergency authorities.

3. The computer-implemented method of claim 2 wherein:
    determining that the known passenger requires assistance comprises:
        analyzing the first inputs;
        analyzing the second inputs; and
        comparing the first inputs and second inputs to a historical knowledge base of historical first inputs and second inputs to compute a predicted action of the known passenger to determine that the known passenger requires assistance.

4. The computer-implemented method of claim 2 wherein:
    determining that the known passenger requires assistance comprises comparing the inputs from the one or more sensors and the inputs from the one or more cameras to a knowledge base that includes known passenger conditions.

5. The computer-implemented method of claim 4 wherein the inputs from the one or more sensors includes biometric data.

6. The computer-implemented method of claim 1 further comprising:
    determining, by the processor, that a passenger is an unknown passenger;
    using, by the processor, facial recognition techniques to compare the set of characteristics of the unknown passenger to characteristics of persons of interest.

7. The computer-implemented method of claim 6 wherein:
    the action to perform comprises contacting emergency authorities.

8. The computer-implemented method of claim 6 wherein:
    the action to perform comprises ceasing the operation of the elevator car in which the unknown person is present.

9. The computer-implemented method of claim 1 further comprising:
    comparing, by the processor, performance of the elevator car at a current time to performance of the elevator at a previous time to determine a decrease in performance; wherein:
    the action to perform is requesting maintenance of the elevator car.

10. A computer system for operating an elevator car, the system comprising:
a memory; and
a processor system communicatively coupled to the memory;
the processor system configured to:
receive first inputs from one or more sensors; and
receive second inputs from one or more cameras;
determine the presence of a known passenger on the elevator using the first inputs and the second inputs,
retrieve a set of attributes related to the known passenger from a knowledge base,
wherein the set of attributes includes at least one of health, age, and interests;
determine a set of characteristics related to the known passenger using the first inputs and the second inputs,
wherein the set of characteristics includes at least one of clothing, height, weight, and gender;
predict a set of predicted actions of the known passenger, using machine-learning techniques;
determine an action to perform based on the set of predicted actions,
wherein the action comprises customizing and displaying content based on the set of attributes;
identifying, by repeated actions observed from the second inputs, distinguishing marks of a personal belonging associated with the known passenger; and
in response to receiving an indication that the personal belonging is missing, transmitting information on a suspect passenger observed, from the second inputs, with the personal belonging to a law enforcement agency.

11. The computer system of claim 10 wherein the processor is further configured to:
determine that the known passenger requires assistance; wherein:
the action to perform comprises contacting emergency authorities.

12. The computer system of claim 11 wherein:
determining that the known passenger requires assistance comprises:
analyzing the first inputs;
analyzing the second inputs; and
comparing the first inputs and second inputs to a historical knowledge base of historical first inputs and second inputs to compute a predicted action of the known passenger to determine that the known passenger requires assistance.

13. The computer system of claim 11 wherein:
determining that the known passenger requires assistance comprises comparing the inputs from the one or more sensors and the inputs from the one or more cameras to a knowledge base that includes known passenger conditions.

14. The computer system of claim 13 wherein the inputs from the one or more sensors includes biometric data.

15. The computer system of claim 10 wherein the processor is further configured to:
determine that a passenger is an unknown passenger;
use facial recognition techniques to compare the set of characteristics of the unknown passenger to characteristics of persons of interest.

16. The computer system of claim 15 wherein:
the action to perform comprises contacting emergency authorities.

17. The computer system of claim 15 wherein:
the action to perform comprises ceasing the operation of the elevator car in which the unknown person is present.

18. A computer program product comprising:
a computer-readable storage medium having program instructions embodied therewith, the program instructions readable by a processor system to cause the processor system to perform a method comprising:
receiving first inputs from one or more sensors;
receiving second inputs from one or more cameras;
determining the presence of a known passenger on the elevator using the first inputs and the second inputs;
retrieving, by the processor, a set of attributes related to the known passenger from a knowledge base,
wherein the set of attributes includes at least one of health, age, and interests;
determining a set of characteristics related to the known passenger using the first inputs and the second inputs,
wherein the set of characteristics includes at least one of clothing, height, weight, and gender;
predicting a set of predicted actions of the known passenger, using machine-learning techniques;
determining an action to perform based on the set of predicted actions,
wherein the action comprises customizing and displaying content based on the set of attributes;
identifying, by repeated actions observed from the second inputs, distinguishing marks of a personal belonging associated with the known passenger; and
in response to receiving an indication that the personal belonging is missing, transmitting information on a suspect passenger observed, from the second inputs, with the personal belonging to a law enforcement agency.

* * * * *